United States Patent [19]

Reed

[11] Patent Number: 4,507,275

[45] Date of Patent: Mar. 26, 1985

[54] PROCESS FOR PRODUCING AND RECOVERING ELEMENTAL SULFUR FROM ACID GAS

[75] Inventor: Robert L. Reed, Tulsa, Okla.

[73] Assignee: Standard Oil Company (Indiana), Chicago, Ill.

[21] Appl. No.: 527,909

[22] Filed: Aug. 30, 1983

[51] Int. Cl.$^3$ .................... C01B 17/04; B01D 53/36; B01J 8/04

[52] U.S. Cl. .................... 423/574 R; 423/576; 422/115; 422/171; 422/190

[58] Field of Search ............... 423/574 R, 574 G, 576; 422/115, 171, 190

[56] References Cited

U.S. PATENT DOCUMENTS

| | | | |
|---|---|---|---|
| Re. 28,830 | 5/1976 | Hunt, Jr. et al. | 423/574 R |
| 2,767,062 | 10/1956 | Duecker | 423/576 |
| 4,035,474 | 7/1977 | Kunkel et al. | 423/574 R |
| 4,180,554 | 12/1979 | Goddin, Jr. et al. | 423/574 R |
| 4,243,647 | 1/1981 | Hass et al. | 423/573 G |
| 4,309,402 | 1/1982 | Al-Mudderis | 423/574 R |
| 4,315,904 | 2/1982 | Lell et al. | 423/574 R |
| 4,430,317 | 2/1984 | Reed et al. | 423/574 R |

FOREIGN PATENT DOCUMENTS 938087 12/1973 Canada ............................ 423/574 R

OTHER PUBLICATIONS

"MCRC Process for Improving Claus Plant Recovery" –A. B. Coady 6-9-1976, Presented to Canadian Natural Gas Processors' Assoc.
"MAXISULF-A Process to Enhance Sulphur Recovery in Claus Plants"–R. Lell and U. Neumann, Davy McKee AG.
"The MCRC Sub-Dewpoint Sulphur Recovery Process"–R. E. Heigold and D. E. Berkeley Delta Projects Limited.

Primary Examiner—Earl C. Thomas
Assistant Examiner—Jeffrey E. Russel

[57] ABSTRACT

A system and process produce high actual levels of sulfur recovery from acid gas. The system includes two conventional Claus reactors and two cold bed adsorption (CBA) reactors. Four condensers are provided, one disposed before each of the catalytic reactors, and one disposed after the CBA reactor. The system includes a gas clean-up treatment zone for hydrogenation, drying and oxidation of gas to provide stoichiometric ratio of $H_2S$ and $SO_2$. The gas is passed through the clean-up treatment zone prior to being fed to the first of the CBA reactors. The system is designed to operate either in a recovery mode or in a regeneration mode. In the recovery mode, the reactors are in series and the CBA reactors are operated below dew point of sulfur. In regeneration mode, effluent from the clean-up treatment zone is heated in a heat exchanger using effluent from the first catalytic reactor as the heat source. The resulting regeneration gas is fed to one of the two CBA reactors to vaporize sulfur and regenerate the catalyst. The vaporized sulfur is recovered in the condenser. The effluent from the condenser is passed to the other CBA reactor which is operated in the recovery mode during regeneration.

12 Claims, 2 Drawing Figures

PROCESS FOR PRODUCING AND RECOVERING ELEMENTAL SULFUR FROM ACID GAS

FIELD OF THE INVENTION

This invention relates to processes and systems for producing elemental sulfur. In particular, it relates to recovering elemental sulfur from acid gas using an improved modified Claus process in connection with an improved tail gas cleanup process.

BACKGROUND OF THE INVENTION

The Claus process is widely used by the industry for the production of elemental sulfur. The process is designed to carry out the Claus reaction:

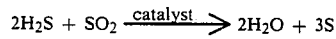

The reaction is favored by decreased temperature and by removal of vaporized elemental sulfur.

In the conventional Claus process, the operating conditions of the reactors in which the Claus reaction is carried out are selected to maintain elemental sulfur in the vapor state. Otherwise, the elemental sulfur would deposit on the catalyst and deactivate it. To assure high conversion rates, the reaction is carried out in a plurality of consecutive reactors. Elemental sulfur is condensed and removed from the effluent of a preceding reactor before it is passed to a subsequent reactor. The removal of sulfur permits the reactors to be maintained at progressively reduced temperatures.

Generally, presently desired recovery levels in the range of 97-99% necessitate the use of a modified Claus process which includes a thermal reactor, two catalytic reactors and two low temperature catalytic reactors, such as, for example, cold bed adsorption (CBA) reactors in which elemental sulfur is adsorbed or deposited on the catalyst. The reaction in a CBA reactor is generally carried out at a temperature range, for example, from about 250°-280° F. (121°-138° C.) which results in the condensation of elemental sulfur on the alumina catalyst. The low temperatures in the CBA reactor favor the reaction and the condensation of sulfur removes it from the reaction phase thereby allowing more H$_2$S and SO$_2$ to react. The sulfur condensing on the catalyst deactivates it. Accordingly, a second CBA reactor is provided so that while the first CBA reactor is in the recovery mode, the second reactor is being regenerated and vice versa.

Although acceptable recovery levels can be achieved by the above-described conventional modified Claus process, pressing environmental considerations may soon require significantly improved recovery levels of 99.9% or higher. In order to keep pace with growing environmental concerns, there exists a need to improve this conventional modified Claus process such that optimal recovery levels can be assured.

U.S. patent application Ser. No. 343,661 (now U.S. Pat. No. 4,430,317) by Reed, Petty and Goddin filed on Jan. 28, 1982, a continuation-in-part of application Ser. No. 239,730 filed Mar. 2, 1981, discloses an improved Claus tail gas clean up process for use in a sulfur recovery process. The application issued as U.S. Pat. No. 4,430,317 and is incorporated herein by reference. This tail gas clean up process may be used together with the conventional modified Claus process. However, even when these two processes are used in conjunction, actual recovery will fall significantly short of theoretical recovery because of losses caused by leaking valves. In the conventional modified Claus process, the regeneration gas flow is routed to the reactor on regeneration by introducing a pressure differential in the flow stream at the second condenser. This results in a pressure differential of as much as 5 psi between the reactor on regeneration and that on adsorption. Valves that can give leak-free operation under these conditions are very expensive steam-jacketed globe valves of German manufacture (Gutermuth valves) at critical locations in conventional modified Claus plants.

Further, in the conventional modified Claus process, effluent from the first catalytic reactor is used for regeneration. This effluent comprises about 15% sulfur compounds and 30% water by volume. Regeneration with wet, high-sulfur gas contributes to actual losses.

Thus, there is a long-felt and unsatisfied need for a process and system that will maximize both actual and theoretical sulfur recovery levels by eliminating losses from leaky valves and wet, high-sulfur regeneration gas and overcome the above-mentioned disadvantages of prior art processes.

BRIEF DESCRIPTION OF THE INVENTION

The present invention significantly improves the actual sulfur recovery levels in a modified Claus process. The acid gas and air are reacted in a Claus thermal reactor in a conventional manner and then the resulting gas is passed through a plurality of catalytic reactors and condensers. Sulfur is removed from the gas after each catalytic reactor. The gas from the condenser preceding the first low temperature catalytic reactor is subjected to a clean up treatment (process). The clean up treatment converts substantially all sulfur species into H$_2$S, removes water and oxidizes the gas to produce a stoichiometric mixture of H$_2$S and SO$_2$. The treated gas is cooled and then passed to the first low temperature catalytic reactor. The effluent from the first low temperature catalytic reactor is cooled and then passed to the second catalytic reactor.

One of the low temperature catalytic reactors is regenerated whenever the catalyst loading exceeds a predetermined level less than that at which catalytic activity falls below a predetermined value. Regeneration is effected by a regeneration gas which is produced by heating the treated gas. Heating can be effected, for example, by heat exchange with the effluent from the first catalytic reactor or by heat exchange with the feed to the first catalytic reactor; other heat sources can also be utilized either directly or indirectly.

DETAILED DESCRIPTION OF THE INVENTION

Figure 1:
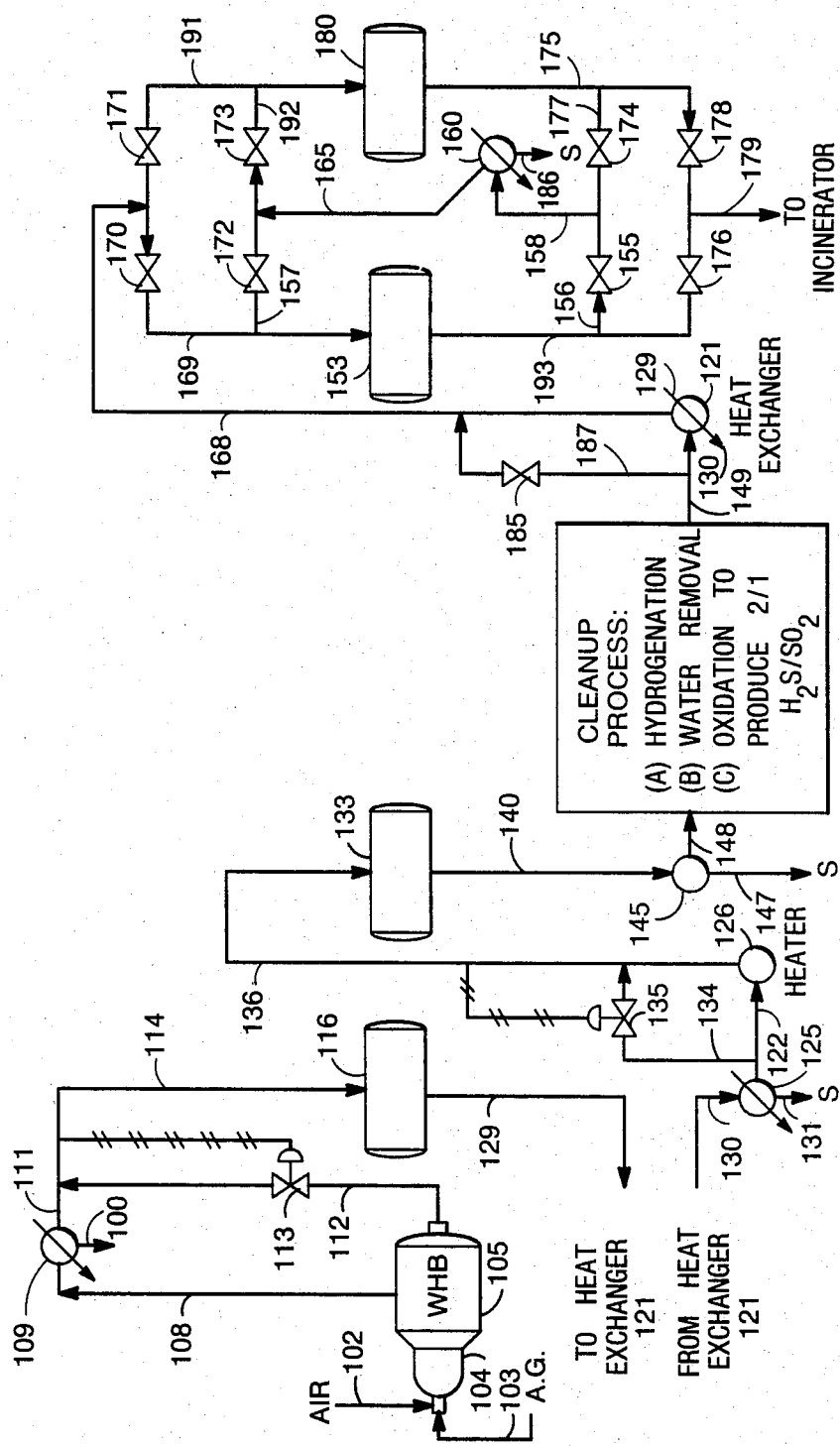
FIG. 1 is a detailed flow sheet of the improved tail gas cleanup process of the present invention.

The present invention provides a process and system for achieving the highest sulfur recovery levels commercially attainable with current technology using only Claus conversion. While the theoretical recovery levels are not higher than those calculated for an improved tail gas process used with a conventional modified Claus process such as previously described using cold bed adsorption (CBA) reactors, the actual recovery levels using the combination disclosed in this invention are significantly improved.

A first aspect of this invention contributing to this result is that losses caused by leaking valves are essentially eliminated. According to this aspect of the invention, effluent from the third condenser is used for regeneration gas in the system and process of the present invention. In this manner, the pressure differential through the system is considerably reduced, such that the process flow stream is unlikely to leak through the valves. Since the effluent from the third condenser has a relatively low concentration of sulfur, the loss of sulfur through any leaks is further minimized.

A second aspect of this invention contributing to this result is that the regeneration gas from the third condenser is passed through the improved tail gas cleanup process before it enters the regenerating reactor. According to this aspect of the invention, regeneration with dry, low-sulfur gas produces a more reactive catalyst that will increase the actual recovery levels above those obtained when the improved tail gas cleanup process is used with the conventional modified Claus process.

The system of the present invention is designed to operate either solely in the recovery mode or simultaneously in both the recovery mode and the regeneration mode. In the recovery mode, the process of the present invention is carried out in a manner similar to the conventional modified Claus process, except that all reactors are in series and the first catalytic reactor is preferably operated at high temperatures to provide effluent which can heat the regeneration gas.

Briefly, acid gas and air are fed into a conventional Claus thermal reactor. The effluent from the thermal reactor is cooled in a waste heat boiler, passed through a first condenser to remove sulfur and fed into a first catalytic Claus reactor at a temperature in the range of about 450°–650° F. (232°–343° C.). The effluent from the first catalytic reactor is passed to a heat exchanger and the effluent from the heat exchanger is passed through a second condenser to remove additional sulfur. The gas stream from the second condenser is heated and passed to a second catalytic reactor (a standard Claus reactor) at an inlet temperature in the range of about 350°–420° F. (177°–216° C.). The effluent from the second catalytic reactor is passed through a third condenser where more elemental sulfur is recovered.

From the third condenser, the gas is passed to a clean-up treatment zone. Since this gas is at a relatively constant flow rate and constant composition, the clean-up treatment is easily controlled.

The clean-up treatment (process) comprises three basic steps: hydrogenation, water removal, and oxidation to produce a 2:1 ratio of $H_2S$ (hydrogen sulfide) to $SO_2$ (sulfur dioxide). During the hydrogenation step, substantially all sulfur compounds present in the tail gas are converted to $H_2S$. This step necessary so that it is possible to cool the gas stream without sulfur condensation and corrosion problems. It also decreases sulfur losses in the form of COS and $CS_2$.

The sulfur containing compounds of the Claus plant gaseous effluent stream can be converted to hydrogen sulfide in an hydrogenation zone. The hydrogenation zone can be either catalytic or noncatalytic, although a catalytic hydrogenation zone is preferred. Useful catalysts are those containing metals of Groups VB, VIB, VIII and the Rare Earth series of the Periodic Table of the Elements, as published in Perry, *Chemical Engineers' Handbook*, Fifth Edition, 1973. The catalyst may be supported or unsupported although catalysts supported on a silica, alumina, or silica-alumina base are preferred. The preferred catalysts are those containing one or more of the metals, cobalt, molybdenum, iron, chromium, vanadium, thorium, nickel, tungsten and uranium. Particularly preferred are standard cobalt-molybdenum type hydrogenation catalysts, for example, United Catalyst Type C29-2 available from United Catalysts Incorporated, Louisville, Ky., 40232.

The reducing equivalents, hydrogen and carbon monoxide, necessary for converting sulfur-containing compounds to hydrogen sulfide in the hydrogenation zone can be provided from an external source or can be present within the Claus plant effluent stream. Preferably, the hydrogen can be present in the Claus plant effluent stream. However, if insufficient reducing equivalents are present, then, for example, a reducing gas generator can be used for the partial combustion of fuel gas to produce reducing equivalents in the form of hydrogen and carbon monoxide. Other methods of providing hydrogen will be readily apparent to those skilled in sulfur recovery.

The hydrogenation zone can be operated at a temperature in the range of about 450° F. to about 650° F. when a catalyst as described above is present. Preferably, the hydrogenation zone is operated at a temperature from about 580° F. to about 650° F. to provide adequate initiation and conversion of the sulfur containing compounds to hydrogen sulfide.

Following conversion of the sulfur containing compounds to hydrogen sulfide, the resulting hydrogen sulfide containing stream can be pressurized to the system operating pressure necessary and suited to compensate, for example, for the pressure drop of subsequent steps, which can include steps for the catalytic oxidation of hydrogen sulfide to sulfur dioxide as well as steps for the catalytic conversion of hydrogen sulfide and sulfur dioxide to sulfur under low temperature and low water vapor conditions. Generally, it will be sufficient to pressurize the system to a pressure greater than about 5 psig, preferably in the range of about 6 psig to about 12 psig. This can be accomplished by any suitable arrangement of pressurizing equipment, for example, compressors, blowers, and the like.

It is preferred that the hydrogen sulfide containing stream be cooled prior to pressurization to facilitate selection and to improve deliverability of the pressurizing equipment. Preferably, the hydrogen sulfide containing stream is cooled to a temperature below about 350° F., and most preferably in the range of from about the water dewpoint for the hydrogen sulfide containing stream to about 350° F. before pressurizing. Generally, for Claus plant tail gas streams having about 30 mol% water, the hydrogen sulfide stream should not be cooled below about 180° F. If the water dew point is attained, condensation of water droplets can cause operating difficulties in conventional compressors. Nevertheless, in principle, even cooling to lower temperatures can be achieved prior to pressurization. After cooling the hydrogen sulfide containing stream from the hydrogenation zone to a temperature preferably in the range of about 180° F. to about 350° F., the cool stream can be pressurized to an effective system operating pressure. The resulting pressurized stream can then be introduced into a cooling and water condensing zone, which can comprise a contact condenser, for example, a quench tower effective for substantial temperature reduction of the stream therein, where it is contacted with, for example, cooled water, to cool and to condense and remove water from the pressurized hydrogen sulfide containing stream.

In the contact condenser, the pressurized hydrogen sulfide containing stream can preferably be contacted, for example, with water having a temperature in the range from about 40° F. to about 120° F. to condense water and remove such from the pressurized hydrogen sulfide containing stream.

The resulting pressurized hydrogen sulfide containing stream of reduced water content having a temperature in the range of about 40° F. to about 120° F., and preferably in the range of about 40° F. to about 90° F., can be provided to an oxidation zone in which about a ⅓ portion of the hydrogen sulfide can be converted to sulfur dioxide in the presence of stoichiometric molecular oxygen without any substantial excess. In a preferred embodiment of the invention, this can be achieved by dividing the pressurized hydrogen sulfide containing stream of reduced water content into about ⅓ and about ⅔ portions, and oxidizing the about ⅓ portion to sulfur dioxide in the presence of sufficient molecular oxygen to accomplish the oxidation to sulfur dioxide.

According to a preferred aspect of the invention, the oxidation of the about ⅓ portion can be performed catalytically in the presence of an oxidation catalyst effective for conversion of hydrogen sulfide to sulfur dioxide in the absence of any substantial excess of molecular oxygen over that required for the conversion. A slight deficiency of molecular oxygen is, however, preferred. Suitable catalysts can include the standard Claus activated alumina catalyst for which a feed temperature to the catalyst bed in the range of about 450° F. to about 700° F., preferably in the range of about 500° F. to about 550° F., can be utilized. To prevent changes in the catalyst structure, the temperature within the reactor can preferably be kept below about 900° F. As a result, for many plants, more than one oxidation reactor can be utilized with interstage cooling to prevent temperature exceeding about 900° F. in any given reactor.

The effluent from the oxidation reactor containing substantially sulfur dioxide having a temperature in the range of about 750° F. to about 1050° F., preferably less than about 850° F. to provide an operating margin below 900° F. to prevent damage to catalyst as mentioned above, can then be cooled and recombined with the about ⅔ portion of the pressurized hydrogen sulfide containing stream of reduced water content to produce a gaseous reaction mixture stream having a hydrogen sulfide:sulfur dioxide ratio of about 2:1 and having a temperature preferably below the sulfur freezing point. The gaseous reaction mixture stream can then be introduced into a low temperature Claus catalytic conversion zone operated in the range of about 160° F. to about 260° F., and preferably in the range of about 200° F. to about 220° F. to produce elemental sulfur.

The clean-up treatment as just described increases recovery in a number of ways. The drying step lowers the content of water in the reaction mixture. This improves the adsorption of sulfur in the CBA reactor following the cleanup process because sulfur/water condensation problems are avoided and because the low water content permits the forward Claus reaction to occur even at plateau conditions (described below in greater detail) in the regeneration mode. Further, the lower water content the removal of elemental sulfur permits the CBA reactor to be operated at lower temperatures. For example, in the past the CBA reactors could not successfully be operated at temperatures below about 260° F. (127° C.). But with the combination disclosed in the present invention, the CBA reactors can be operated at temperatures as low as about 160° F. (71° C.) or even lower, preferably in the range of about 200°-220° F. (93°-104° C.). Since the Claus reaction is exothermic, this lower temperature improves the equilibrium and thereby also contributes to increased sulfur adsorption. Finally, increased sulfur adsorption lowers the vapor pressure of sulfur so that less sulfur is lost in the process flow stream.

After the process stream passes through the clean-up treatment zone, it is fed into a first low temperature reactor (such as a CBA reactor) at a temperature generally in the range of 160° to 260° F. (71°-127° C.). The Claus reaction proceeds in the first CBA reactor and sulfur is adsorbed on the catalyst. Effluent from the first CBA reactor is directed for cooling through a fourth cooler/condenser. Effluent from the fourth cooler/condenser is then passed to a second low temperature reactor (such as a CBA reactor). The inlet temperature of the second low temperature reactor is in the range from about 160°-260° F. (71°-127° C.) and preferably in the range of about 200°-220° F. (93°-104° C.). The effluent from the second CBA reactor is passed to the incinerator.

In regeneration mode, effluent from the clean-up treatment zone is forced through a reheat exchanger before it is passed to one of the CBA reactors for regeneration. The valves are adjusted to switch the relative positions of the first and the second low temperature reactors when the second low temperature reactor needs to be regenerated. During regeneration, at about 520° F. (271° C.) the adsorbed sulfur is vaporized. The exact temperature varies somewhat, depending on the actual acid gas composition. This is known as the "sulfur plateau" temperature. In the present invention, because of the low water content of the regeneration gas, forward Claus reaction occurs even at plateau conditions. The temperature of the effluent from the reactor remains constant at this "sulfur plateau" temperature until all the sulfur is vaporized. Then the catalyst heats rapidly to the inlet temperature which is generally in the range of about 625°-675° F. (329°-357° C.). This temperature is maintained for several hours to "soak" the catalyst and restore its activity. In actual practice, it may be found that the soak period can be shortened which would increase the recoveries. During the soak period, little reverse Claus reaction is possible because of the small amount of sulfur vapor in the gas. When the process stream leaves the CBA reactor on regeneration it is directed to the fourth condenser and then to the other CBA reactor, operating in recovery mode. In practice the latter reactor can be operated at a temperature of about 245° F. (118° C.) when the first CBA-type reactor is undergoing regeneration, preferably in the range of about 245°-260° F.

DESCRIPTION OF THE PREFERRED EMBODIMENT OF THE PRESENT INVENTION

FIG. 1 depicts the preferred embodiment of the process and the system of the present invention.

Referring now to FIG. 1, air and acid gas are fed into a thermal reactor 104 via lines 102 and 103, respectively. Effluent gases from a thermal reactor 104 are cooled in a waste heat boiler 105. The resulting gases at about 550° F. (288° C.) are passed via a line 108 to a first condenser 109 which condenses vaporized sulfur. The gases leave the first condenser 109 via a line 111 at about 400° F. (204° C.). Sulfur is removed from condenser 109 via a line 100 and recovered.

Hot bypass gas at a temperature of about 1100° F. (593° C.) from the waste heat boiler 105 is introduced via a line 112 and a valve 113 into the gas stream 111 leaving the first condenser 109, such that the resulting gas stream 114 is at a temperature of about 565° F. (296° C.). This high inlet temperature is required in order to provide an effluent temperature from a first catalytic reactor 116 of at least 650°-700° F. (343°-371° C.).

The gas stream 114 is passed to the first catalytic reactor 116 where further conversion of $H_2S$ and $SO_2$ into elemental sulfur takes place. The effluent from the first catalytic reactor 116 is directed via a line 129 to a heat exchanger 121, where it serves as a heat source.

Then the gas stream is passed via a line 130 to a second condenser 125. Elemental sulfur is recovered from the condenser 125 via a line 131. The effluent from the second condenser 125 is then divided. One portion is passed via a line 122 through the heater 126; a second portion is passed via the line 122 and a first bypass line 134 through a first bypass valve 135. The two portions are recombined in line 136 and fed into a second catalytic reactor 133.

The temperature of the gas fed into the second catalytic reactor is controlled using the first bypass line 134 with the valve 135. The temperature of the gas stream in line 122 is generally about 260° F. (127° C.), and the temperature in line 136 is generally about 380° F. (193° C.). In the second catalytic reactor 133 further conversion of $H_2S$ and $SO_2$ into elemental sulfur takes place. The effluent from the second catalytic reactor 133 is passed via a line 140 into a third condenser 145.

The resulting elemental sulfur is recovered from the third condenser 145 via a line 147. The gas stream leaves the third condenser 145 at a temperature of in the range of about 250°-280° F. (121°-138° C.) such as at about 260° F. (127° C.) and it is passed via a line 148 to the clean-up treatment (process) zone.

The operation of the improved tail gas cleanup process is described below in reference to FIG. 2 and in the patent application of Reed, et al., now U.S. Pat. No. 4,430,317.

The effluent from the Clean-up Process zone is passed via a line 149, a second bypass line 187, a second bypass valve 185, a line 168, valve 170, and line 169 to a first CBA reactor (third catalytic reactor) 153. The first CBA reactor 153 is fed with effluent in a temperature range of about 160°-260° F. (71°-127° C.) and preferably in the range of about 200°-220° F. (93°-104° C.). In the first CBA reactor 153 the Claus reaction takes place and elemental sulfur is adsorbed on the catalyst.

If the feed to the first CBA reactor 153 is at a preferred temperature of about 220° F. (104° C.), the effluent should exit from that reactor at a temperature of about 276° F. (136° C.). The effluent from the first CBA reactor 153 is passed through a line 193, a line 156, a valve 155, and a line 158 to a fourth cooler/condenser 160 for cooling.

Effluent from the fourth condenser 160, preferably at a low temperature but such that elemental sulfur is not solidified in the fourth condenser, for example, about 225° F. (107° C.), is directed to a second CBA reactor 180 via a line 165, a valve 173, and lines 192 and 191. Again, the Claus reaction proceeds and sulfur is adsorbed on the catalyst. The effluent from the second CBA reactor 180 is then directed to an incinerator via a line 175, a valve 178, and a line 179 to an incinerator (not shown). When both CBA reactors are in the recovery mode, the second CBA reactor 180 loads at a much lower rate than the first CBA reactor 153.

The operation with both reactors operating in the recovery mode is continued until the catalyst in the first CBA reactor 153 reaches a level of catalyst loading less than that at which the catalyst becomes significantly deactivated by sulfur deposits. At that point, the operation of the system is switched to the regeneration mode.

In the regeneration mode, the effluent gases from the Clean-up Process are forced through a regeneration heater 121. This is accomplished by closing the second bypass valve 185 so that the gases are taken via a line 149 to the exchanger 121. In the exchanger 121, the gases are heated to about 625°-675° F. (329°-357° C.) before they are passed via the line 168 through the valve 170 and the line 169 into the regeneration CBA reactor 153. In the regenerating CBA reactor 153, the hot gas causes the sulfur adsorbed on the alumina catalyst to vaporize.

Regeneration according to this invention with hot, dilute process gases has decided advantages over the standard practice of using hot, rich process gases (e.g., effluent from the first catalytic reactor 116). First, the catalyst is regenerated to a lower equilibrium level of adsorbed sulfur because of the lower sulfur vapor content of the regeneration gas. Second, the lower $H_2S$ content of the gas results in a lower corrosion rate of the carbon steel in contact with the gas. Third, the recovery is virtually unaffected by leaks in the switching valves. Since the regeneration gas is relatively dilute in sulfur species, a small leak of the regeneration stream into the tail gas will not increase sulfur loss significantly. Further, with the present invention it is no longer necessary to route regeneration gas flow to the regenerating reactor by introducing a pressure differential in the flow stream at the second condenser according to the standard modified Claus process. This standard process results in a pressure difference between the reactor in regeneration mode and the reactor in recovery mode of as much as 5 psi. According to the present invention, however, the pressure differential across the valves is approximately only 1.0 psi, so even if one of the valve does not have a perfect seal, the amount of leakage will be small.

The effluent gases from the regenerating reactor 153 are passed via the line 193, the line 156, the valve 155 and the line 158 to the fourth condenser 160. Sulfur is recovered from the condenser 160 via the line 186. Then the effluent is passed via the line 165, the valve 173, the line 192 and the line 191 into the second CBA reactor 180. The second CBA reactor 180 ensures highly acceptable recovery levels even when regeneration is taking place in the first CBA reactor 153. The effluent from the reactor 180 is passed via a line 175, through a valve 178 and via a line 179 into the incineration (not shown).

Cooling is accomplished by bypassing the regeneration exchanger 121. Once the regenerated reactor 153 is cooled, the normal recovery cycle as described above can begin again. Note that the second bypass valve 185 can be adjusted during normal operation to force a small amount of gas, less than 5%, through the regeneration exchanger 121. The continuous gas flow reduces the possibility of corrosion occurring in the exchanger which usually occurs in a sulfur plant when flow is stopped in a line or a piece of equipment.

When the second CBA reactor 180 requires regeneration, valves 171, 172, 174 and 176 are opened and valves 170, 173, 155 and 178 are closed. Effluent from the regeneration heater 121 passes via line 168, the valve 171 and the line 191 to the regenerating CBA reactor 180. Elemental sulfur is evaporated in CBA reactor 180 and carried with effluent gases via the line 175, a line 177, the valve 174 and the line 158 to the fourth condenser 160. In the condenser 160 sulfur is collected via the line 186 and effluent gases are passed via the line 165 through the valve 172, the line 157 and the line 169 to the CBA reactor 153 operating in the recovery mode. The CBA reactor 153 ensures high recovery levels even when regeneration is taking place in CBA reactor 180. The effluent from the reactor 153 is passed via the line 193 and the valve 176 and the line 179 into the incinerator (not shown).

Figure 2:
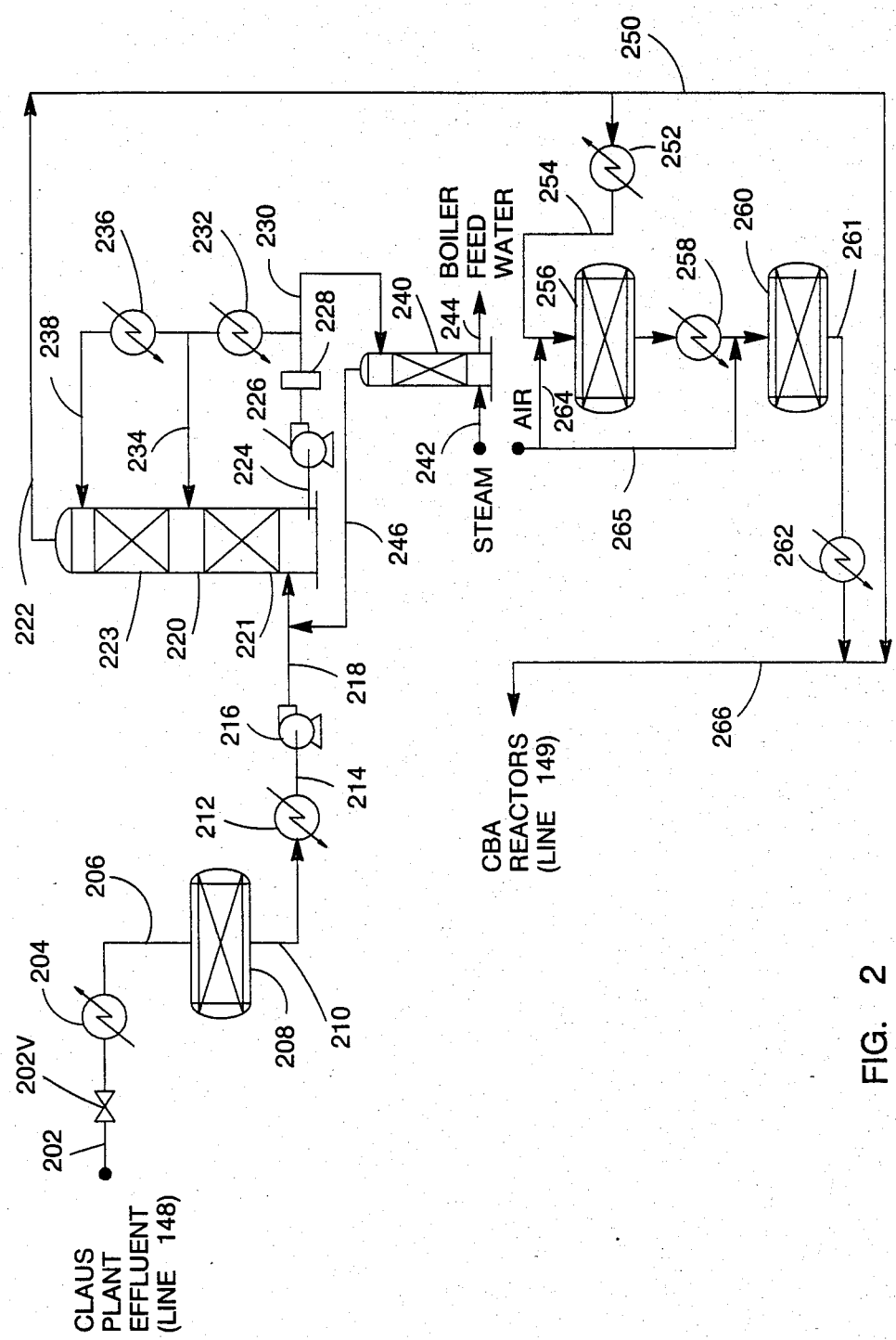
FIG. 2 is a detailed flow sheet of the Clean-up Process shown schematically in the block of FIG. 1.

Referring now to FIG. 2, FIG. 2 illustrates in detail the Clean-up Process of FIG. 1.

Referring now to FIG. 2 in detail, a Claus plant effluent stream is conveyed (via line 148 in FIG. 1) from line 148 through line 202 having valve 202V to hydrogenation reactor feed heater 204 where the stream is heated to an effective temperature for hydrogenation of sulfur containing compounds to hydrogen sulfide in hydrogenation zone 208. The resulting heated stream is passed through line 206 to hydrogenation zone 208, for example, a catalytic hydrogenation zone containing catalyst such as cobalt-molybdenum catalyst effective for hydrogenation of the sulfur containing compounds in the Claus plant effluent stream to hydrogen sulfide. The resulting hydrogen sulfide containing stream in line 210 is cooled in cooler 212 and introduced through line 214 into compressor 216 to provide an effective system operating pressure in line 218.

The pressurized hydrogen sulfide containing stream in line 218 can have hydrogen sulfide containing gas recovered from quench water as hereinafter described introduced, for example, by line 246 from sour water stripper 240, and the resulting combined stream can be introduced into a contact condenser, for example, near the bottom of quench column 220 having two packed zones 221 and 223 with water being introduced by spraying into the top of the column. The quench column can include one or more packed sections; in the column illustrated, two packed sections 221 and 223 are utilized.

Water can be introduced into the column at one or more locations as indicated by lines 234 and 238 to flow downward through the column contacting the pressurized hydrogen sulfide stream and to cool the stream and to condense and remove water therefrom. The condensed water containing some hydrogen sulfide can be removed from the bottom of the quench column 220 via line 224, pump 226, and filter 228 and a portion can be returned by exchangers 232 and 236, respectively, to be reintroduced into the column by lines 234 and 238. As shown, a portion of the condensed water removed from the bottom of quench tower 220 can also be sent by line 230 to a sour water stripper 240 with stripping steam provided by line 242 for removal of hydrogen sulfide; then the stripped water can be sent via line 244, for example, to a boiler feed water system.

The overhead stream 222 from condenser 220 represents a pressurized hydrogen sulfide containing stream of reduced water content which can be split into about ⅓ and about ⅔ portions. The about ⅓ portion is heated, for example, in exchanger 252, to a temperature in the range effective for oxidation of the contained hydrogen sulfide to sulfur dioxide in oxidation zone 256 and is introduced into oxidation zone 256 by line 254 with air or other appropriate source of molecular oxygen introduced by line 264. The effluent from first oxidation zone 256 can be cooled by interstage cooler 258 and introduced into second oxidation zone 260 with molecular oxygen by line 265 as illustrated. The total amount of free (molecular) oxygen in lines 264 and 265 is a sufficient quantity to reduce all hydrogen sulfide present to sulfur dioxide or in slight excess of that quantity, but preferably not in substantial excess of that stoichiometric amount. The total amount of free oxygen can be divided between line 264 and line 265 so that the temperature does not exceed about 850° F. in either oxidation zone 256 or 260. The effluent stream in line 261 from the combined oxidation zones can then be cooled, for example, in cooler 262 to a suitable temperature to be recombined with the about ⅔ portion of the pressurized hydrogen sulfide stream of reduced water content in line 250 to produce a gaseous reaction mixture in line 266 having about a 2:1 molar ratio of hydrogen sulfide to sulfur dioxide and having a temperature in the range of about 160°–260° F. The resulting gaseous reaction mixture stream 266 can then be introduced into a low temperature Claus catalytic conversion zone via line 149 shown in FIG. 1.

The following example is provided for illustrative purposes and is not intended to limit the claimed invention in any manner.

EXAMPLE

The theoretical recoveries of sulfur were calculated for the process of the present invention for a 68% $H_2S$ feed.

| Period | Time (Hours) | Sulfur Recovery (Weight %) |
|---|---|---|
| Recovery Mode | 17.0 | 99.98 |
| Regeneration Mode | | |
| Heating | 2.0 | 99.94 |
| Plateau | 1.4 | 99.90 |
| Soaking | 4.0 | 99.90 |
| Cooling | 2.0 | 99.94 |
| Total | 26.4 Avg. | 99.96% |

This example demonstrates that when an acid gas containing 68% of $H_2S$ is used, the average recoveries of over 99.96 weight percent can be achieved using the process and the system of the present invention and that the recoveries of sulfur fall below 99.96% only for a short period of time.

Many changes and modifications will occur to those skilled in the art upon studying this disclosure. All such changes and modifications that fall within the spirit of this invention are intended to be included within its scope as defined by the appended claims.

I claim:

1. In an improved modified Claus process of the type including the steps of reacting acid gas and air in a thermal reaction zone, reacting the resulting gas in four catalytic reaction zones arranged in series and maintained at progressively reduced temperatures, sulfur being removed in cooling zones between said reaction zones, the last two of said catalytic reaction zones being maintained below the dew point of sulfur, sulfur being deposited on the catalyst, the improvement comprising:
(a) hydrogenating the gas prior to passing it to said last two catalytic reaction zones;
(b) removing water from said gas prior to passing it to said last two catalytic reaction zones;
(c) oxidizing a portion of said gas to produce a stoichiometric mixture of $H_2S$ and $SO_2$; then
(d) when the catalyst loading in one of said last two catalytic reaction zones exceeds a predetermined level, heating the effluent subjected to steps (a), (b) and (c) to produce a regenerating gas;
(e) feeding said regenerating gas to said one catalytic reaction zone until the catalyst is regenerated then cooling said gas to remove sulfur and passing said gas to the second of the two catalytic reaction zones, said second catalytic reaction zone being maintained below the dew point of sulfur, steps (d) and (e) being carried out only for as long as necessary to regenerate the catalyst.

2. The process of claim 1 wherein heating of the effluent of step (d) is effected by heat exchange with the effluent from the first catalytic reaction zone.

3. The process of claim 1 wherein the said effluent is heated in step (d) to the temperature in the range of about 625°–675° F. (329°–357° C.).

4. The process of claim 2 wherein said effluent is heated in step (d) to the temperature in the range of about 625°–675° F. (329°–357° C.).

5. An improved process for producing and recovering elemental sulfur from acid gas, said process comprising:
(a) reacting acid gas and air in a thermal reaction zone maintained at such conditions so as to facilitate the Claus reaction, to produce elemental sulfur vapor;
(b) cooling the gas produced in the thermal reaction zone to condense the elemental sulfur vapor and recovering elemental sulfur therefrom; then,
(c) heating the cooled gas; then,
(d) reacting the heated gas, in the presence of a catalyst for facilitating the Claus reaction, in a first catalytic reaction zone to produce vaporized elemental sulfur therein; then,
(e) cooling the gas produced in the first catalytic reaction zone to condense the elemental sulfur vapor and recovering elemental sulfur therefrom; then,
(f) heating the cooled gas; then,
(g) reacting the heated gas, in the presence of a catalyst for facilitating the Claus reaction, in a second catalytic reaction zone to produce vaporized elemental sulfur therein; then,
(h) cooling the gas produced in the second catalytic reaction zone to condense the elemental sulfur vapor and recovering elemental sulfur therefrom; then,
(i) hydrogenating the gas prior to passing it to two further catalytic reaction zones; then,
(j) removing water from said gas prior to passing it to said further catalytic reaction zones; then,
(k) oxidizing a portion of said gas to produce a stoichiometric mixture of $H_2S$ and $SO_2$; then,
(l) reacting the gas, in the presence of a catalyst for facilitating a Claus reaction to produce elemental sulfur, in a third catalytic reaction zone to produce and deposit elemental sulfur on said catalyst, the gas being at a temperature sufficiently low to permit the reaction in the third catalytic reaction zone to proceed below the dew point of elemental sulfur; then,
(m) cooling gas from the third catalytic reaction zone; then,
(n) reacting the gas, in the pressure of a catalyst for facilitating a Claus reaction to produce elemental sulfur, in a fourth catalytic reaction zone to produce and deposit elemental sulfur on said catalyst, the cooled gas in step (m) being at a temperature sufficiently low to permit the reaction in the fourth catalytic reaction zone to proceed below the dew point of elemental sulfur; then,
(o) discharging the effluent produced in step (n);
(p) continuing steps (a) through (o), inclusive, until catalyst loading exceeds a predetermined level less than that at which the instantaneous recovery of elemental sulfur falls below a predetermined value; then,
(q) heating the gas of step (k) to a temperature sufficiently high to allow regeneration of catalyst but sufficiently low to avoid damaging the catalyst, to produce a regeneration gas and passing said regeneration gas to one of the third and the fourth catalytic reaction zones to regenerate the catalyst therein;
(r) cooling the gas from the one catalytic reaction zone to condense elemental sulfur vapor and recovering sulfur therefrom; then,
(s) passing the gas of step (r) to the other of the third and fourth catalytic reaction zones;
(t) discharging the cooled gas, steps (q) through (t), inclusive, being carried out only until the catalyst is regenerated, step (p) being carried out the rest of the time.

6. The process of claim 5 wherein heating in step (q) is effected by passing the effluent from the first catalytic reactor as a heating medium through a first heat exchanger zone such that the heating medium heats said gas of step (q).

7. The process of claim 5 wherein the gas in step (c) is heated to the temperature in the range of about 450°–650° F. (232°–343° C.) and the gas in step (f) is heated to the temperature in the range of about 350°–420° F. (177°–216° C.), the gas in step (q) is heated to the temperature in the range of about 625°–675° F. (329°–357° C.).

8. An improved apparatus for producing and recovering elemental sulfur from acid gas, said system comprising:
(a) a thermal reactor for reacting acid gas and air at such conditions so as to facilitate the Claus reaction and to produce elemental sulfur vapor;
(b) a first condenser operably connected to the thermal reactor for receiving and for cooling the gas produced in the thermal reaction zone to condense elemental sulfur vapor and for recovering elemental sulfur therefrom;
(c) first heating means operably connected to the first condenser for receiving and for heating the gas cooled by the first condenser;
(d) a first catalytic reactor operably connected to the first heating means for receiving and for reacting the heated gas to produce vaporized elemental sulfur therein;
(e) a second condenser operably connected to the first catalytic reactor for receiving and for cooling the gas produced in the first catalytic reactor to condense elemental sulfur vapor and recovering elemental sulfur therefrom;

(f) second heating means operably connected to the second condenser for receiving and for heating the gas cooled by said second condenser;

(g) a second catalytic reactor operably connected to the second heating means for receiving and for reacting the heated gas to produce vaporized elemental sulfur therein;

(h) a third condenser operably connected to the second catalytic reactor for receiving and for cooling the gas produced in the second catalytic reactor to condense sulfur therefrom;

(i) a clean-up treatment means operably connected to the third condenser for receiving and for hydrogenating, drying and oxidizing the effluent from said third condenser;

(j) a third catalytic reactor operably connected to the clean-up treatment means for receiving and for reacting the treated gas to produce and deposit elemental sulfur on said catalyst, said third catalytic reactor being maintained at a temperature sufficiently low to permit the reaction to proceed below the dewpoint of elemental sulfur;

(k) a fourth catalytic reactor operably connected to the third catalytic reactor for receiving and for reacting the treated gas to produce and deposit elemental sulfur on said catalyst, said fourth catalytic reactor being maintained at a temperature sufficiently low to permit the reaction to proceed below the dew point of elemental sulfur;

(l) a heat exchanger;

(m) means operably connected for passing at least a portion of the effluent from said clean-up treatment means to said heat exchanger and for producing a hot regeneration gas whenever the recovery of elemental sulfur falls below a predetermined rate; and (n) means operably connected for passing said hot regeneration gas from the heat exchanger to one of the third and fourth catalytic reactors to vaporize elemental sulfur deposited on the catalyst and to regenerate said catalyst.

9. The apparatus of claim 8 wherein:

first heating means heats the gas to the temperature in the range of about 450°–650° F. (232°–343° C.);

second heating means heats the gas to the temperature in the range of about 350°–420° F. (177°–216° C.); and said third condenser cools the gas to the temperature in the range of about 250°–280° F. (121°–138° C.).

10. The apparatus of claim 8 wherein said heat exchanger utilizes the gas from said first catalytic reactor as the heating medium for heating the effluent from the clean-up treatment means.

11. The apparatus of claim 10 wherein said second heating means comprises a second heat exchanger for utilizing the heating medium leaving said first heat exchanger.

12. The apparatus of claim 11 wherein said first heat exchanger is designed to heat the gas therein to the temperature in the range of about 625°–675° F. (329°–357° C.).

* * * * *